United States Patent
Fang et al.

(10) Patent No.: US 10,216,293 B2
(45) Date of Patent: Feb. 26, 2019

(54) ACTIVE PEN FOR A TOUCH MODULE, A TOUCH INPUT SYSTEM AND A DRIVING METHOD THEREOF

(71) Applicants: BOE Technology Group Co., Ltd., Beijing (CN); Hefei Xinsheng Optoelectronics Technology Co., Ltd., Hefei (CN)

(72) Inventors: Zhixiang Fang, Beijing (CN); Dayu Zhang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 92 days.

(21) Appl. No.: 15/335,656

(22) Filed: Oct. 27, 2016

(65) Prior Publication Data

US 2017/0192539 A1    Jul. 6, 2017

(30) Foreign Application Priority Data

Jan. 4, 2016 (CN) .......................... 2016 1 0004786

(51) Int. Cl.
*G06F 3/0346* (2013.01)
*G06F 3/0354* (2013.01)
(Continued)

(52) U.S. Cl.
CPC ........ *G06F 3/03545* (2013.01); *G06F 3/0346* (2013.01); *G06F 3/0383* (2013.01);
(Continued)

(58) Field of Classification Search
CPC ......... G06F 2203/04106; G06F 3/0346; G06F 3/03545; G06F 3/0383; G06F 3/0416; G06F 3/044; G06F 3/04883
See application file for complete search history.

(56) References Cited

U.S. PATENT DOCUMENTS 4,494,077 A * 1/1985 Fukaya .................... H03F 3/72
330/124 R
5,696,538 A * 12/1997 Kishi .................. G06F 3/03545
178/19.01
(Continued)

FOREIGN PATENT DOCUMENTS

| CN | 102591481 A | 7/2012 |
| CN | 103218065 A | 7/2013 |

(Continued)

OTHER PUBLICATIONS

Nov. 16, 2017—(CN) Office Action application 201610004786.3 with English Translation.

*Primary Examiner* — Ram A Mistry
(74) *Attorney, Agent, or Firm* — Banner & Witcoff, Ltd.

(57) ABSTRACT

An active pen for a touch module, including: gravity sensing part, a signal transmitting part connected with an output end of said gravity sensing part; wherein, said gravity sensing part is configured to output a corresponding gravity sensing output signal according to an angle between said active pen and a horizontal plane; said signal transmitting part is configured to transmit said gravity sensing output signal to said touch module. Such active pen has no requirement on the material of the pen tip, reducing the cost.

13 Claims, 6 Drawing Sheets

(51) Int. Cl.
  *G06F 3/041*  (2006.01)
  *G06F 3/044*  (2006.01)
  *G06F 3/038*  (2013.01)
  *G06F 3/0488*  (2013.01)

(52) U.S. Cl.
  CPC ............ *G06F 3/044* (2013.01); *G06F 3/0416* (2013.01); *G06F 3/04883* (2013.01); *G06F 2203/04106* (2013.01)

(56) References Cited

U.S. PATENT DOCUMENTS

| | | | | |
|---|---|---|---|---|
| 2002/0180714 | A1* | 12/2002 | Duret | G06F 3/0346 345/179 |
| 2012/0182271 | A1* | 7/2012 | Wu | G06F 3/03545 345/179 |
| 2012/0327042 | A1* | 12/2012 | Harley | G06F 3/03545 345/179 |
| 2015/0309577 | A1 | 10/2015 | You et al. | |

FOREIGN PATENT DOCUMENTS

| | | |
|---|---|---|
| CN | 104156111 A | 11/2014 |
| TW | 201411476 A | 3/2014 |

\* cited by examiner

Line width

ACTIVE PEN FOR A TOUCH MODULE, A TOUCH INPUT SYSTEM AND A DRIVING METHOD THEREOF

This application claims priority to and the benefit of Chinese Patent Application No. 201610004786.3 filed on Jan. 4, 2016, which application is incorporated herein in its entirety.

TECHNICAL FIELD

Embodiments of the present disclosure relate to an active pen for a touch module, a touch input system and a driving method thereof.

BACKGROUND

With an explosive growth of smart phones and tablets, touch screens are widely applied in daily life, and more and more application software require touches with higher precision. Since a finger is too thick, with which it is hard to perform precise writing and quick writing on a small-sized screen, stylus pens for touch screens are used more and more widely, and the requirements for the performance of the stylus pens are higher and higher.

The stylus pens for touch screens mainly include passive pens and active pens. The passive pen functions as a finger of human being. When the passive pen touches a touch display screen, a small part of current on the touch display screen flows from a touch point to the passive pen, which equals to a change of an electrode capacitor at the touch point, by detecting the change of the electrode capacitor of a touch chip of the touch display screen, the position of the touch point can be determined. Normally, the passive pen cannot express the brush stroke and the pressure degree of the pen, so it cannot represent the line and the thickness and the aesthetic perception of a character. Meanwhile, the active pen is a stylus pen solution implemented based on the existing capacitive touch screen system hardware, with higher precision, low cost and good user experience, so that it is different from the passive pen. Active pen itself can function as a signal transmitting source, which can transmit an actuating signal, so as to change the electric field of a touch point and further to change the electrode capacitor at the touch point, and the touch chip of the touch screen may determine the position of the touch point by detecting the change of the electrode capacitor.

The active pen may implement a variation of a line width by pressure sensing principle, i.e., by adding a pressure sensor, which simulates real brush strokes and lines according to pressure signals, so that the pen can sense the variation of a user's handwriting force, so as to change the thickness of the brush stroke according to the variation of the handwriting force, to achieve a good user experience. However, such active pen has a higher requirement on the material of the pen tip, which costs higher; further, the pen tip of such active pen may cause physical damages on the touch screen, which may damage the structure of the surface layer of the touch screen.

SUMMARY

According to at least an embodiment of the present disclosure, there is provided an active pen for a touch module, comprising: gravity sensing part, a signal transmitting part connected with an output end of said gravity sensing part; wherein, said gravity sensing part is configured to output a corresponding gravity sensing output signal according to an angle between said active pen and a horizontal plane; said signal transmitting part is configured to transmit said gravity sensing output signal to said touch module.

According to at least an embodiment of the present disclosure, there is provided a touch input system, comprising: touch module and active pen; said active pen comprising: gravity sensing part, a signal transmitting part connected with an output end of said gravity sensing part; said gravity sensing part is configured to output a corresponding gravity sensing output signal according to an angle between said active pen and a horizontal plane; said signal transmitting part is configured to transmit said gravity sensing output signal to said touch module; said touch module includes a plurality of touch electrode, and a touch chip connected with said touch electrode; said touch chip is configured to, according to a signal transmitted from said active pen, received by the respective touch electrodes, detect a capacity change amount of the respective touch electrodes.

According to at least embodiment of the present disclosure, there is provided a driving method for a touch input system, comprising: obtaining the angle between said active pen and a horizontal plane; outputting a corresponding gravity sensing output signal according to an angle between said active pen and a horizontal plane; transmitting said gravity sensing output signal to a touch module.

BRIEF DESCRIPTION OF THE DRAWINGS

In order to make objects, technical details of the embodiments of the invention apparent, the drawings necessary to describe the embodiments of the invention will be briefly introduced below. Apparently, the described embodiments are just some embodiments of the invention. Based on the described embodiments herein, those skilled in the art can obtain other drawings according to these drawings, without any inventive work.

DETAIL DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

In combination with the drawings, an active pen of a touch module, a touch input system and a driving method thereof provided by embodiments of the present disclosure will be described in detail.

Figure 1A:
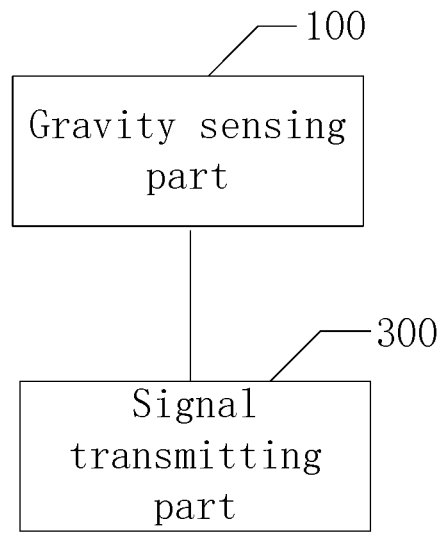
FIG. 1a is a structural diagram of an active pen provided by an embodiment of the present disclosure.

Embodiments of the present disclosure provides an active pen for a touch module. FIG. 1a is a structural diagram of an active pen provided by an embodiment of the present disclosure. With reference to FIG. 1a, the active pen comprises: a gravity sensing part 100, and a signal transmitting part 300 connected with an output end of the gravity sensing part. The gravity sensing part 100 is configured to, according to an angle between the active pen and the horizontal plane, output a corresponding gravity sensing output signal; the signal transmitting part 300 is configured to transmit said gravity sensing output signal to said touch module.

Figure 1B:
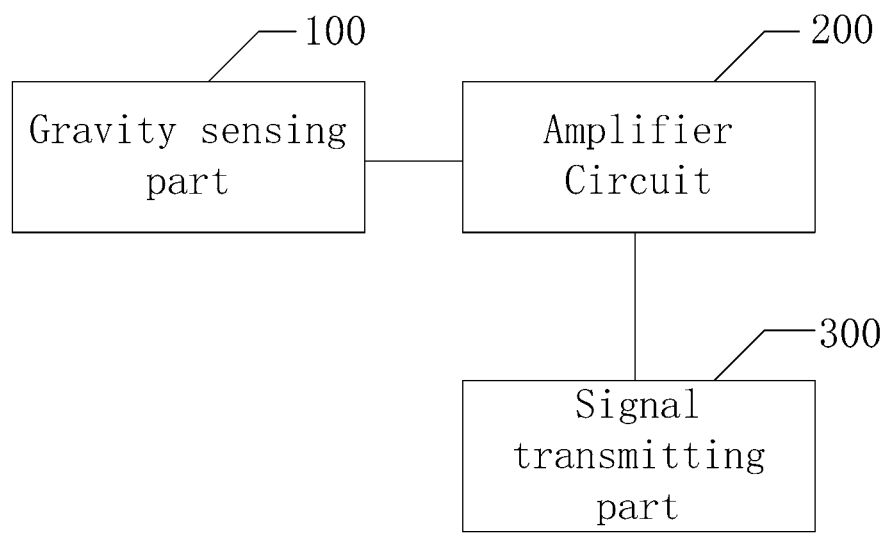
FIG. 1b is a structural diagram of an active pen provided by the embodiment of the present disclosure.

In addition, in order to increase the signal strength of the gravity sensing output signal, an amplifier circuit may be added between the gravity sensing part and the signal transmitting part. FIG. 1b is another structural diagram of the active pen provided by an embodiment of the present disclosure. With reference to FIG. 1b, the active pen may include: a gravity sensing part 100, an amplifier circuit 200 connected with an output end of the gravity sensing part 100, and a signal transmitting part 300 configured at a pen tip of the active pen and connected with an output end of the amplifier circuit 200; wherein, the gravity sensing part 100 is configured to output a corresponding gravity sensing output signal according to an angle between said active pen and a horizontal plane;

the amplifier circuit 200 is configured to perform an amplifying processing on said gravity sensing output signal with a corresponding amplification factor;

the signal transmitting part 300 is configured to transmit the amplifying-processed signal to said touch module.

In the active pen provided by an embodiment of the present disclosure, the gravity sensing part and the signal transmitting part connected with the output end of the gravity sensing part are configured in the active pen. Based on a gravity sensing principle, a change of a signal amount output is achieved by changing the angle between the active pen and the horizontal plane, that is, as the incline angle of the pen changes, the output signal changes as well, thereby handwriting brush stroke with different thicknesses is provided, to achieve a variation of a line width without any requirement on the material of the pen tip of the active pen so as to decrease the cost.

In the active pen provided by an embodiment of the present disclosure, the voltage value of the gravity sensing output signal output by the gravity sensing part 100 may increase as the angle between the active pen and the horizontal plane increases. For example, a range of the angle between the active pen and the horizontal plane may be [0,90°], so that the change of the signal amount output can be achieved by changing the angle between the active pen and the horizontal plane, and the higher angle is, the greater the voltage value of the gravity sensing output signal is. When the angle is 90°, the voltage value of the gravity sensing output signal is a maximum, the handwriting brush stroke obtained in this case is relatively thicker.

Furthermore, in the active pen provided by an embodiment of the present disclosure, the relationship between the angle between the active pen and the horizontal plane and the voltage value of the gravity sensing output signal output by the gravity sensing part may meet the following formula:

$$V_{out} = V_0 \cdot \sin \alpha;$$

wherein, $\alpha$ indicates the angle between the active pen and the horizontal plane, $V_0$ indicates an initial input voltage value of the active pen, $V_{out}$ indicates the voltage value of the gravity sensing output signal.

Figure 2:
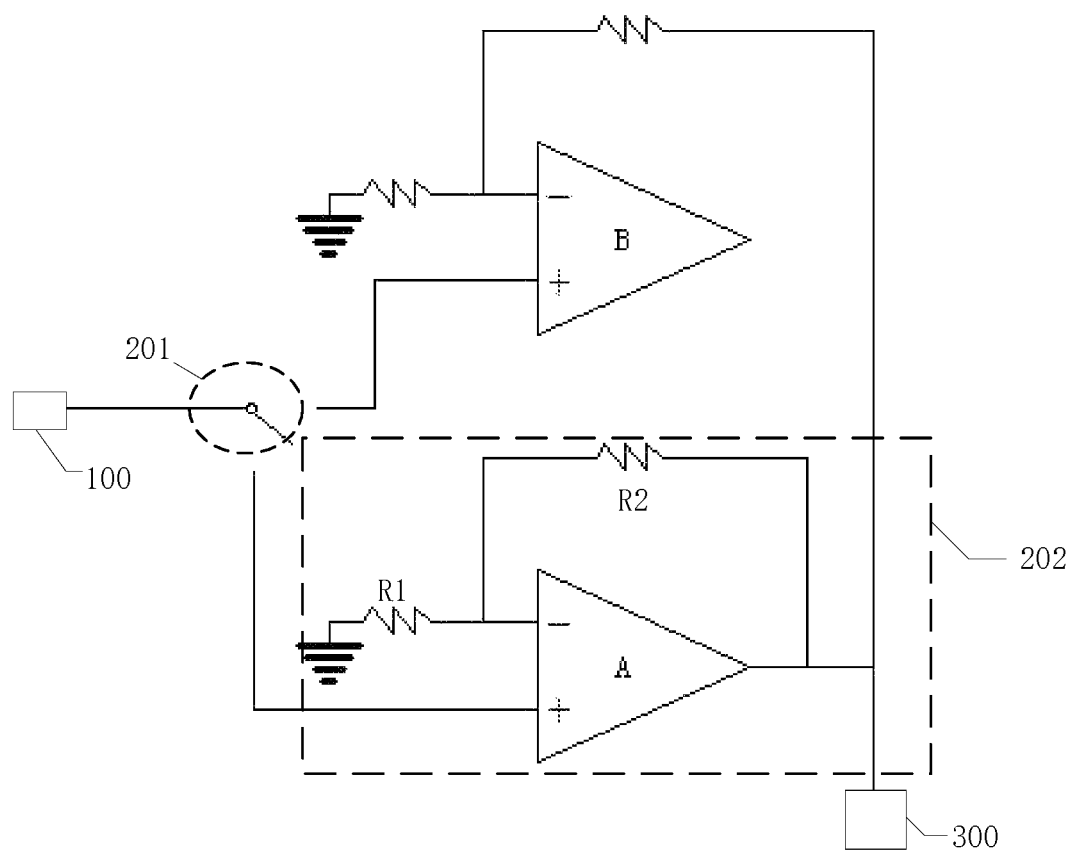
FIG. 2 is a structural diagram of an amplifier circuit in an active pen provided by an embodiment of the present disclosure.

In an implementation, in the active pen provided by an embodiment of the present disclosure, as shown in FIG. 2, the amplifier circuit 200 may include a switch 201 (labeled at a dashed circle in FIG. 2) and a plurality of amplifier units 202 with different amplifier factors (labeled at a dashed rectangle in FIG. 2). One end of the switch 201 is connected with the gravity sensing part 100, the other end of the switch 201 is selectively connected with an input end of one amplifier unit 202, the output ends of the respective amplifier unit 202 are connected with the signal transmitting part 300, respectively. Since the switch and a plurality of amplifier units with different amplifier factors are configured in the discharge circuit, an adjustable thickness range of the brush stroke displayed on the touch module can be achieved by the switch selectively connecting with the amplifier units with different amplifier factors.

To be noted that FIG. 2 only shows two amplifier units with different amplifier factors, however, the number of the amplifier units may be larger than 2, not limited to the structure in the drawing in the embodiment of the present disclosure, and the amplifier unit with a corresponding amplifier factor is selected to be connected by the switch, to achieve different thickness ranges of the brush stroke, but the number of the amplifier units is not limited hereto.

In the active pen provided by an embodiment of the present disclosure, as shown in FIG. 2, each amplifier unit 202 include a first resistor $R_1$, a second resistor $R_2$ and an operation amplifier. For example, a positive phase input end of the operation amplifier is connected with the other end of the switch 201, a negative phase input end of the operation amplifier is grounded through the first resistor $R_1$, an output end of the operation amplifier is connected with the signal transmitting part 300, the second resistor $R_2$ is connected between the negative phase input end and the output end of the operation amplifier.

Figure 3:
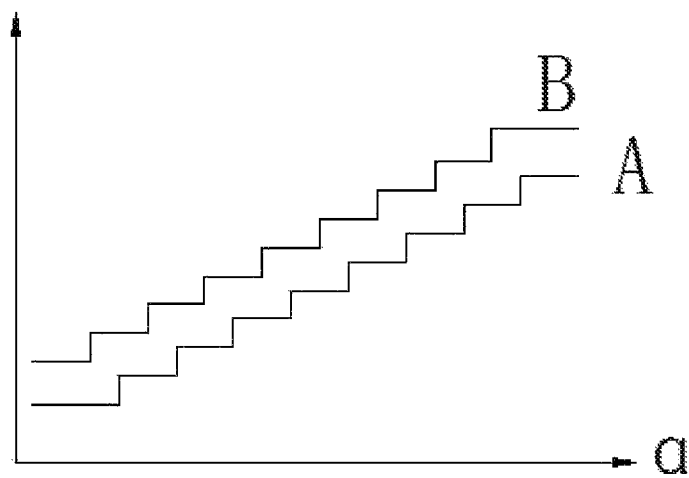
FIG. 3 is a diagram of a relationship between an angle between the active pen and the horizontal plane and the thickness degree of a brush stroke provided by an embodiment of the present disclosure.

To be noted that, the amplifier factors of the operation amplifiers A and B in FIG. 2 are different, and when the amplifier factor of the operation amplifier B is larger than the amplifier factor of A, as shown in FIG. 3, a displayed line width (i.e., a thickness of the handwriting brush stroke) by connecting the switch 201 with the positive phase input end of the operation amplifier B is larger than a displayed line width by connecting the switch 201 with the positive phase input end of the operation amplifier A. As apparently seen from FIG. 3, the displayed line width increases as the angle between the active pen and the horizontal plane increases, so, the thickness of the displayed handwriting brush stroke provided by an embodiment of the present disclosure active pen may be adjusted by two manners: one is the angle between the active pen and the horizontal plane, and the other is selecting an amplifier unit with a corresponding amplifier factor by the switch.

Figure 8:
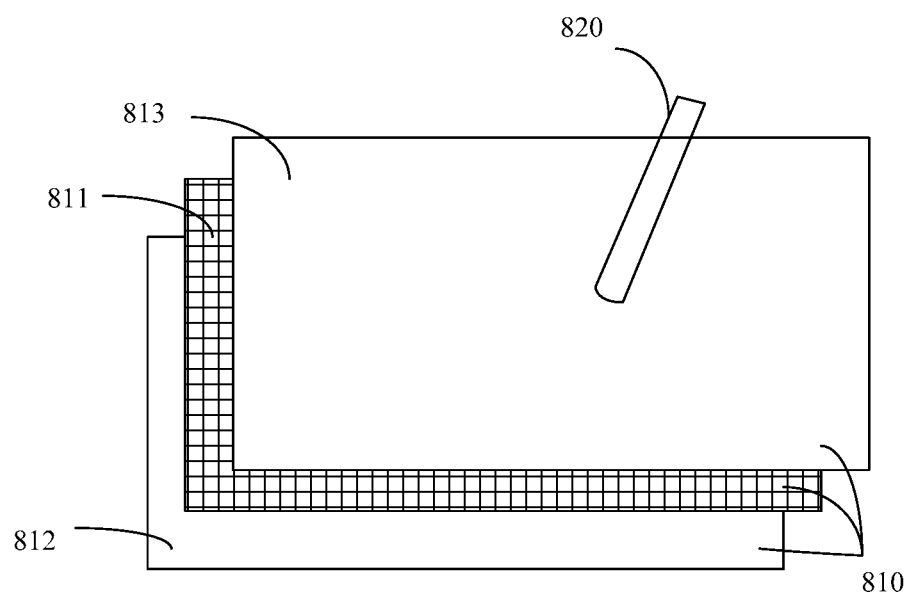
FIG. 8 is a structural diagram of a touch input system provided by an embodiment of the present disclosure.

Based on a same concept of the disclosed embodiment, an embodiment of the present disclosure further provides a touch input system. FIG. 8 is a structural diagram of the touch input system provided by an embodiment of the present disclosure. With reference to FIG. 8, the touch input system comprises: a touch module 810 and an active pen 820; wherein, the active pen is the active pen provided by the embodiments above in the present disclosure.

The touch module 810 includes a plurality of touch electrode 811, and a touch chip 812 connected with the touch electrode 811; a touch chip 812, is configured to, according to a signal transmitted from said active pen, received by the respective touch electrodes 811, detect a capacity change amount of the respective touch electrodes 811.

Figure 4:
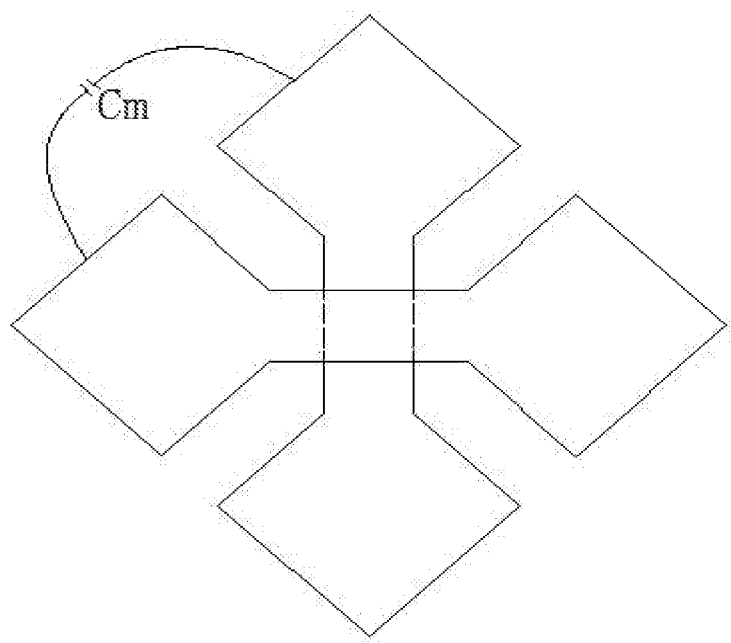
FIG. 4 is a schematic diagram of the touch electrode in the touch module provided by an embodiment of the present disclosure.
Figure 5:
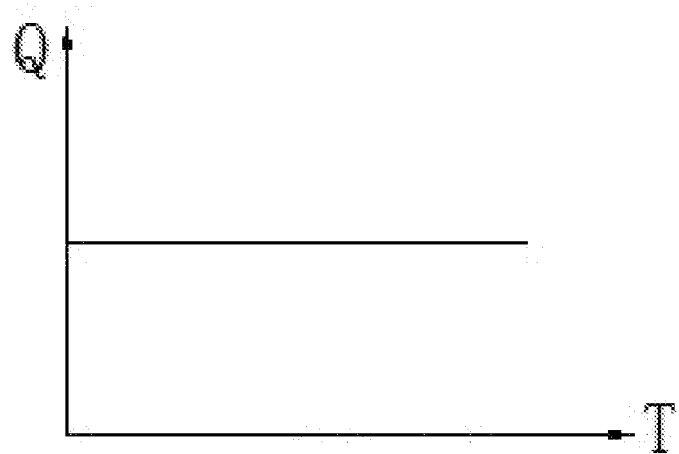
FIG. 5 is a diagram of a relationship between the electricity quantity of the touch electrode and the time, in a state of no pen touch.
Figure 6:
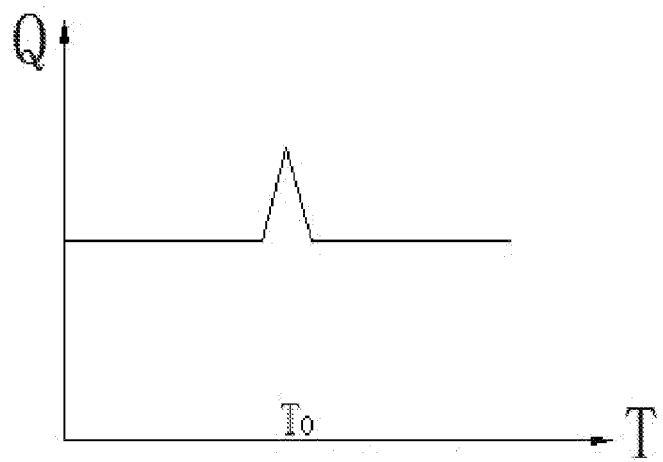
FIG. 6 is a diagram of a relationship between the electricity quantity of the touch electrode and the time, in a state of pen touch.

To be noted that, the touch module may utilize self-capacitance, or may be utilize mutual-capacitance. Taking FIG. 4 as an example, the touch module may include a plurality of touch driving electrodes and touch sensing electrodes crossed with each other and insulated with each other. When the active pen does not approach or touch the touch module, as shown in FIG. 5, an electricity amount in a node capacitance $C_m$ between the touch driving electrodes and the touch sensing electrodes is generated by a driving circuit of the touch module itself, and is detected by a sensing circuit, and the electricity amount maintains unchanged. When the active pen approaches or touches the touch module, after each of the touch driving electrodes and touch sensing electrodes receive the signal transmitted by the active pen, as shown in FIG. 6, the electricity amount of the node capacitance will present a pulsed rise under the influence of the signal transmitted by the active pen, the larger the voltage value of the signal transmitted by the active pen is, the more the capacitance increases, and at this time, the touch chip may detect the position information of the touch point and a capacitance change amount of the touch electrodes.

For example, in the above-mentioned touch input system provided by an embodiment of the present disclosure, in order to achieve the display of the thickness of the brush stroke of the active pen, the touch input system further includes: a display chip 813; the display chip is configured to, according to the capacity change amount of the respective touch electrodes detected by said touch chip, display a stroke thickness degree of said active pen at a touch position.

Figure 7A:
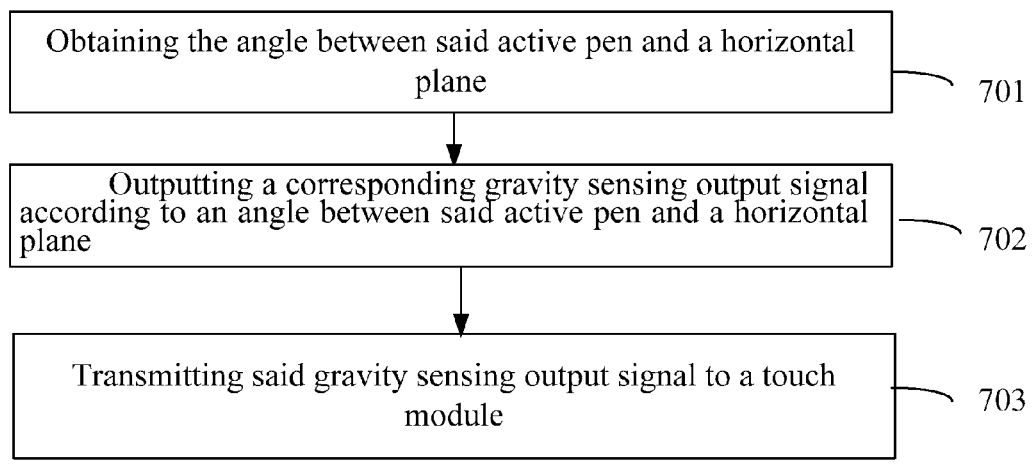
FIG. 7a is a flowchart of a driving method for a touch input system provided by an embodiment of the present disclosure.

Based on a same concept of the disclosed embodiment, an embodiment of the present disclosure further provides a driving method for a touch input system. FIG. 7a is a flowchart of the driving method for a touch input system provided by the embodiment of the present disclosure. As shown in FIG. 7a, a driving method for a touch input system may include steps of:

701, obtaining the angle between the active pen and the horizontal plane;

702, outputting a corresponding gravity sensing output signal according to an angle between said active pen and a horizontal plane;

703, transmitting said gravity sensing output signal to a touch module.

Figure 7B:
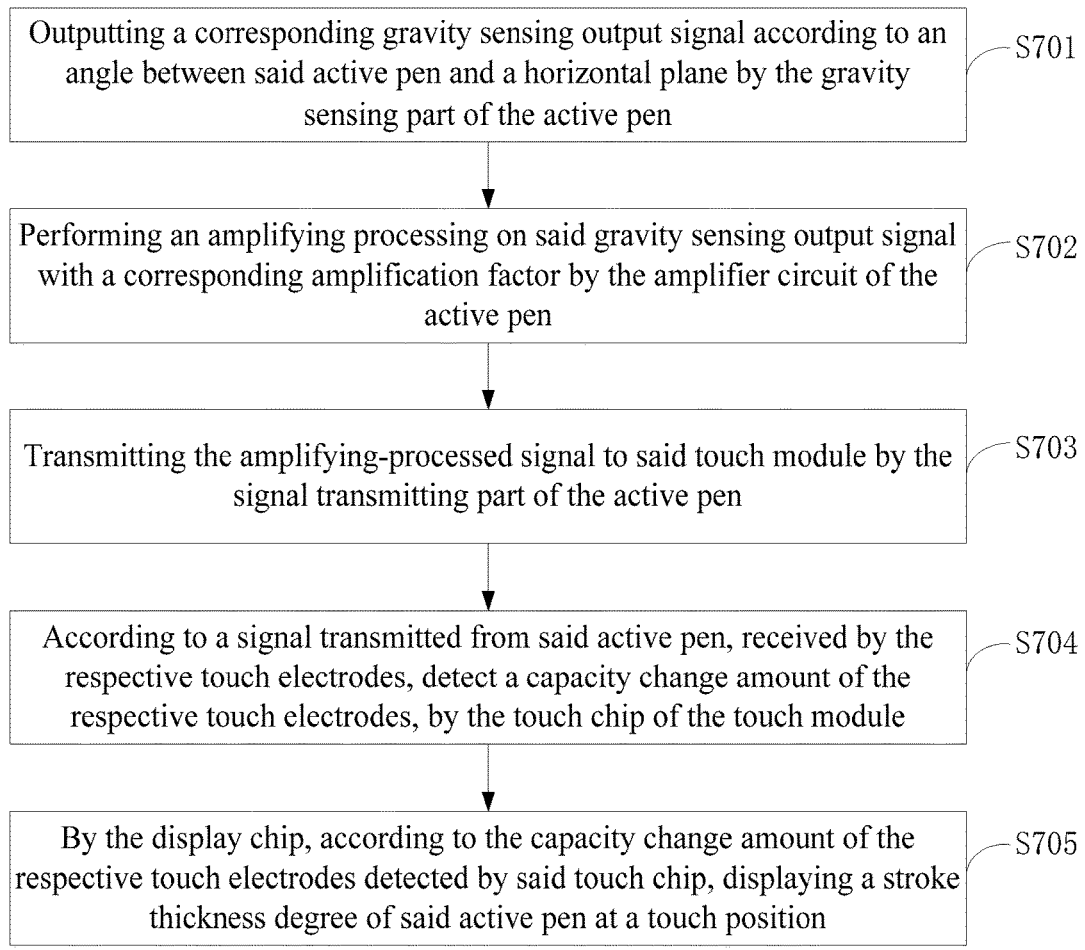
FIG. 7b is a flowchart of a driving method for a touch input system provided by an embodiment of the present disclosure.

FIG. 7b is a flowchart of another driving method for a touch input system provided by an embodiment of the present disclosure. As shown in FIG. 7b, the driving method for a touch input system may further include steps of:

S701, outputting a corresponding gravity sensing output signal according to an angle between said active pen and a horizontal plane by the gravity sensing part of the active pen;

S702, performing an amplifying processing on said gravity sensing output signal with a corresponding amplification factor by the amplifier circuit of the active pen;

S703, transmitting the amplifying-processed signal to said touch module by the signal transmitting part of the active pen;

S704, according to a signal transmitted from said active pen, received by the respective touch electrodes, detecting a capacity change amount of the respective touch electrodes, by the touch chip of the touch module.

In the above-mentioned driving method for a touch input system provided by an embodiment of the present disclosure, by utilizing the gravity sensing part, the amplifier circuit and the signal transmitting part configured in the active pen, based on gravity sensing principle, by changing the angle between the active pen and the horizontal plane to achieve the change of the signal amount, i.e., the output signal changes with the change of the incline angle of the active pen. Then, by utilizing the signal transmitted by the active pen, received by the touch electrodes of the touch module by the touch chip of the touch module, the capacitance change amount of the touch electrodes can be detected and further to determine the thickness degree of the handwriting brush stroke, so as to achieve the line width difference.

In the above-mentioned driving method for a touch input system provided by an embodiment of the present disclosure, in order to display the thickness degree of the handwriting brush stroke, after performing the step S704, as shown in FIG. 7b, the method further comprises:

S705, by the display chip, according to the capacity change amount of the respective touch electrodes detected by said touch chip, displaying a stroke thickness degree of said active pen at a touch position.

An active pen for a touch module, a touch input system and a driving method thereof are provided by embodiments of the present disclosure, the active pen comprising: a gravity sensing part, an amplifier circuit connected with an output end of the gravity sensing part, and a signal transmitting part configured at a pen tip of the active pen and connected with an output end of an amplifier circuit; wherein, the gravity sensing part is configured to output a corresponding gravity sensing output signal according to an angle between said active pen and a horizontal plane; the amplifier circuit is configured to perform an amplifying processing on said gravity sensing output signal with a corresponding amplification factor; the signal transmitting part is configured to transmit the amplifying-processed signal to said touch module. Because the gravity sensing part, the amplifier circuit and the signal transmitting part are added in the active pen, based on a gravity sensing principle, by changing the angle between the active pen and the horizontal plane to achieve the change of the signal amount output, (i.e., the output signal changes with the change of the incline angle of the pen), different thicknesses of the handwriting brush stroke are provided, to achieve the line width difference, and it has no requirement on the material of the pen tip of the active pen, reducing the cost.

A person skilled in the art may understand that the above embodiments are only for illustrating the technical solutions of the present invention, but not for limitation; although an detailed description has been made with respect to the above-mentioned embodiments, the person skilled in the art should understand that he/she can still modify the technical solutions of the embodiments, or make equal alternations on some or all of the technical features; and these modifications or alternations do not make the technical solutions go out of the scope defined by the claims.

The present application claims a priority of a Chinese patent application No. 201610004786.3 filed on Jan. 4, 2016, which is incorporated herein as a part of the present application.

What is claimed is:

1. An active pen for a touch module, comprising: gravity sensing part, a signal transmitting part connected with an output end of the gravity sensing part, wherein,
the gravity sensing part is configured to output a corresponding gravity sensing output signal according to an angle between the active pen and a horizontal plane;
the signal transmitting part is configured to transmit the gravity sensing output signal to the touch module;
a voltage value of the gravity sensing output signal output by the gravity sensing part increases with an increase of the angle between the active pen and the horizontal plane; and
a relationship between the angle between the active pen and the horizontal plane and the voltage value of the gravity sensing output signal output by the gravity sensing part meets the following formula:
$V_{out}=V_0 \cdot \sin \alpha$, wherein, $\alpha$ indicates the angle between the active pen and a horizontal plane, $V_0$ indicates an initial input voltage value of the active pen, and $V_{out}$ indicates the voltage value of the gravity sensing output signal.

2. The active pen according to claim 1, further comprising: an amplifier circuit,
wherein, an input end of the amplifier circuit is connected with the output end of the gravity sensing part, an output end of the amplifier circuit is connected with the signal transmitting part;
the amplifier circuit is configured to perform an amplifying processing on the gravity sensing output signal with a corresponding amplification factor; and
the signal transmitting part is configured to transmit the amplifying-processed signal to the touch module.

3. The active pen according to claim 2, wherein, the amplifier circuit includes a switch and a plurality of amplifier units with different amplifier factors.

4. The active pen according to claim 3, wherein,
an end of the switch is connected with the gravity sensing part, the other end of the switch is selectively connected with an input end of an amplifier unit, output ends of the respective amplifier units are connected with the signal transmitting part, respectively.

5. The active pen according to claim 4, wherein, each of the amplifier units includes a first resistor, a second resistor and an operation amplifier;
a positive phase input end of the operation amplifier is connected with the other end of the switch, a negative phase input end of the operation amplifier is grounded through the first resistor, an output end of the operation amplifier is connected with the signal transmitting part, the second resistor is connected between the negative phase input end and the output end of the operation amplifier.

6. The active pen according to claim 2, wherein the amplifier circuit is configured at a nib of the active pen.

7. The active pen according to claim 1, wherein, a range of the angle between the active pen and a horizontal plane is [0, 90°].

8. A touch input system, comprising: a touch module and an active pen; the active pen comprising: a gravity sensing part, a signal transmitting part connected with an output end of the gravity sensing part, wherein,
the gravity sensing part is configured to output a corresponding gravity sensing output signal according to an angle between the active pen and a horizontal plane;
the signal transmitting part is configured to transmit the gravity sensing output signal to the touch module;
the touch module includes a plurality of touch electrodes, and a touch chip connected with the touch electrode;
the touch chip is configured to, according to a signal transmitted from the active pen, received by the respective touch electrodes, detect a capacity change amount of the respective touch electrodes;
a voltage value of the gravity sensing output signal output by the gravity sensing part increases with an increase of the angle between the active pen and a horizontal plane; and
a relationship between the angle between the active pen and a horizontal plane and the voltage value of the gravity sensing output signal output by the gravity sensing part meets the following formula:
$V_{out}=V_0 \cdot \sin \alpha$, wherein, $\alpha$ indicates the angle between the active pen and a horizontal plane, $V_0$ indicates an initial input voltage value of the active pen, $V_{out}$ indicates the voltage value of the gravity sensing output signal.

9. The touch input system according to claim 6, further comprising: a display chip;
the display chip is configured to, according to the capacity change amount of the respective touch electrodes detected by the touch chip, display a stroke thickness degree of the active pen at a touch position.

10. A driving method for a touch input system, comprising:
obtaining an angle between an active pen and a horizontal plane;
outputting a corresponding gravity sensing output signal according to an angle between the active pen and a horizontal plane; and
transmitting the gravity sensing output signal to a touch module,
wherein, a voltage value of the gravity sensing output signal increases with an increase of the angle between the active pen and a horizontal plane, and
wherein, a relationship between the angle between the active pen and a horizontal plane and the voltage value of the gravity sensing output signal meets the following formula:
$V_{out}=V_0 \cdot \sin \alpha$, wherein, $\alpha$ indicates the angle between the active pen and a horizontal plane, $V_0$ indicates an initial input voltage value of the active pen, $V_{out}$ indicates the voltage value of the gravity sensing output signal.

11. The method according to claim 10, further comprising:
transmitting the amplifying-processed signal to the touch module.

12. The method according to claim 11, further comprising:
according to a signal transmitted from the active pen, received by the respective touch electrodes in the touch module, detecting a capacity change amount of the respective touch electrodes.

13. The method according to claim 12, wherein, further comprising: according to the capacity change amount of the respective touch electrodes detected by the touch chip, displaying a stroke thickness degree of the active pen at a touch position.

* * * * *